Feb. 27, 1951 D. I. BOHN 2,543,398

CIRCUIT BREAKER TRIP MECHANISM

Filed Dec. 8, 1943 13 Sheets-Sheet 1

INVENTOR.
DONALD I. BOHN
BY Samuel Ostrolenk
Attorney

Feb. 27, 1951 D. I. BOHN 2,543,398

CIRCUIT BREAKER TRIP MECHANISM

Filed Dec. 8, 1943 13 Sheets-Sheet 2

INVENTOR.
DONALD I. BOHN
BY Samuel Ostrolenk
Attorney.

Feb. 27, 1951 D. I. BOHN 2,543,398

CIRCUIT BREAKER TRIP MECHANISM

Filed Dec. 8, 1943 13 Sheets-Sheet 3

INVENTOR.
DONALD I. BOHN
BY Samuel Ostrolenk
Attorney.

Feb. 27, 1951 D. I. BOHN 2,543,398

CIRCUIT BREAKER TRIP MECHANISM

Filed Dec. 8, 1943 13 Sheets-Sheet 4

INVENTOR.

DONALD I. BOHN

BY Samuel Ostrolenk

Attorney.

Feb. 27, 1951

D. I. BOHN 2,543,398

CIRCUIT BREAKER TRIP MECHANISM

Filed Dec. 8, 1943

13 Sheets-Sheet 5

INVENTOR.
DONALD I. BOHN
BY Samuel Ostrolenk
Attorney

Feb. 27, 1951 D. I. BOHN 2,543,398

CIRCUIT BREAKER TRIP MECHANISM

Filed Dec. 8, 1943 13 Sheets-Sheet 6

INVENTOR.
DONALD I. BOHN
BY Samuel Ostrolenk
Attorney

Feb. 27, 1951 D. I. BOHN 2,543,398

CIRCUIT BREAKER TRIP MECHANISM

Filed Dec. 8, 1943 13 Sheets-Sheet 7

INVENTOR.
DONALD I. BOHN
BY Samuel Ostrolenk
Attorney.

INVENTOR.
DONALD I. BOHN
BY Samuel Ostrolenk
Attorney.

INVENTOR.
DONALD I. BOHN
BY Samuel Ostrolenk
Attorney.

Feb. 27, 1951 D. I. BOHN 2,543,398

CIRCUIT BREAKER TRIP MECHANISM

Filed Dec. 8, 1943 13 Sheets-Sheet 10

INVENTOR.
DONALD I. BOHN
BY Samuel Ostrolenk
Attorney.

Feb. 27, 1951 D. I. BOHN 2,543,398

CIRCUIT BREAKER TRIP MECHANISM

Filed Dec. 8, 1943 13 Sheets-Sheet 11

INVENTOR.
DONALD I. BOHN
BY
[signature]
Attorney.

Feb. 27, 1951 D. I. BOHN 2,543,398

CIRCUIT BREAKER TRIP MECHANISM

Filed Dec. 8, 1943 13 Sheets-Sheet 12

INVENTOR.
DONALD I. BOHN
BY Samuel Ostrolenk
Attorney

Feb. 27, 1951 D. I. BOHN 2,543,398

CIRCUIT BREAKER TRIP MECHANISM

Filed Dec. 8, 1943 13 Sheets-Sheet 13

INVENTOR.
DONALD I. BOHN
BY
Samuel Ostrolenk
Attorney.

Patented Feb. 27, 1951

2,543,398

UNITED STATES PATENT OFFICE 2,543,398

CIRCUIT BREAKER TRIP MECHANISM

Donald I. Bohn, Pittsburgh, Pa., assignor to I. T. E. Circuit Breaker Company, Philadelphia, Pa., a corporation of Pennsylvania Application December 8, 1943, Serial No. 513,418

6 Claims. (Cl. 200—106)

My invention relates to a new and improved circuit breaker and more particularly to a novel construction for securing high speed circuit interruption.

In many systems such as the direct current or anode circuits of rectifiers, the high rate of current rise makes speed of circuit interruption important. A reduction of even a small fraction of the time heretofore consumed for circuit interruption will substantially reduce the current amplitude which must be interrupted and will correspondingly reduce the resulting arc and therefore the problem of arc extinguishing.

In the design of a circuit breaker, a compromise must be effected between the weight of metal which enables the circuit breaker to withstand large arcing currents and lightness which insures faster tripping requiring less material for the resulting lesser arc.

In cases where the rate of current rise on short circuit is particularly steep it has been found that better operating characteristics are secured by designing the circuit breaker for faster opening. Such an arrangement is shown in my Patent No. 2,412,247.

In the construction shown in that case, the elimination of the use of a latch for holding the circuit breaker contacts closed against the normal opening force of a spring is shown.

Where latches are employed, tripping operation requires the tripping solenoid armature to rise and engage the latch. The latch is in frictional engagement with the spring pressed circuit breaker movable contact arm. The armature of the solenoid must overcome this friction in moving the latch out of engagement with the movable arm in order to permit tripping operation to begin. In order to effect movement of the latch against its friction, a relatively heavy armature operated by a comparatively large magnet is required.

Before the circuit breaker movable contact actually starts to open in such a system, the relatively heavy armature must move until it engages the latch and must then move the latch against friction until it disengages the movable arm. Only then does the spring begin to open the circuit breaker.

In Patent No. 2,412,247 referred to above, the latch with its attendant delays is eliminated, the construction shown being such that upon de-energization of the tripping magnet, as a result of circuit conditions, the spring is immediately free to trip the breaker contacts.

This was effected by having the pull on the armature of the holding magnet exerted by means of a cable connected directly between the armature and the movable contact so that the armature took the full force of the opening spring bias on the movable contact.

In practice, it was found that this construction considerably decreased the tripping time of the breaker. However, as will be apparent, the holding magnet must have a pull equal to the pull of the spring. Therefore, once the magnet was designed, the spring was restricted to one having the same pull, or to state this conversely, the spring pull having been determined, the holding magnet had to be designed to have as great a pull.

In accordance with the present invention, I have constructed a holding magnet circuit breaker in which by the provision of a clutch construction between the spring and the contacts, placed under control of the holding magnet, I can secure a ratio of pull of more than 12 to 1 between the spring and holding magnet. Thus a pull of the order of 420 pounds by the magnet and by the spring elements which hold the magnet in position can withhold a spring pull of 5000 pounds from tripping the breaker until the holding magnet is de-energized. This ratio enables the use of greater spring pull and lighter magnet structure than in the above-referred application, thus further decreasing the opening time of the circuit breaker.

My invention contemplates primarily a connection between the armature of the holding magnet and the movable contact where the armature serves to maintain a detent or engaging member in holding position with respect to the contact or an extension thereof, and where the detent member may be held in such holding position to counteract the 5000 pound force of the opening spring even though only 340 pounds of holding force hold the detent member in place.

Should a simple detent member thus be used, the necessity for providing additional means for moving it out of the way in the event of a backfire or reverse current condition would tend also to slow up the opening operation of the circuit breaker.

Hence, my invention contemplates that the detent member itself be so arranged that on decrease of the holding force of the magnet the detent will automatically be ineffective to retain the movable contact in closed circuit position.

For this purpose, rather than using a simple detent member, my invention contemplates the utilization of a clutch mechanism between the armature of the holding magnet and the movable contact.

This clutch mechanism comprises essentially a floating pin held between matching detents in an extension of the movable contact and a pivotally mounted arm connected by a link to the armature, the said link extending normally to the pivotally mounted arm. The holding force of the armature will hold the pivotally mounted arm down on the pin and press the pin between the detent of the pivotally mounted arm and the detent in the movable contact extension.

However, since the pin is round, and is only tangentially in engagement with either detent, on the occurrence of a backfire or reverse current condition where the force holding the pivotally mounted arm down is reduced, the 5000 pound opening bias on the movable contact becomes effective to cause the movable contact extension to move outwardly rolling the pin out of its detent and raising the pivotally mounted arm.

Thus, while a 400 pound holding force is sufficient to maintain the detents of the pivotally mounted arm and the contact extension in complementary engagement with the pin despite the pull of 5000 pounds on the contact extension; nevertheless, as the holding force of the magnet drops, a critical point is quickly reached wherein the pin may roll out of the detents, raising the pivotally mounted arm.

We have found that by sloping the side of the detent in the pivotally mounted arm against which the pin bears at an outward angle of the order of one degree from the vertical, snagging, owing to almost imperceptible wear, is prevented and the contacts will open immediately every time without interfering with the holding operation.

My invention also contemplates the incorporation of an overcurrent trip means with the holding magnet and armature structure, above set forth, so that the circuit breaker will be effective to trip the circuit open on the occurrence of overcurrent as well as of backfire conditions.

Since the members which thus connect the armature of the holding magnet and the movable contact are thus preferably rigid members, which themselves are interconnected by the clutch mechanism above described, the reengagement operation of the clutch must be so arranged that such reengagement can occur without interfering with the rigidity and strength of the members.

For this purpose, another characteristic of our invention resides in mounting the clutch mechanism, and especially the pivotally mounted arm thereof, in a movable housing which also contains and positions the holding magnet and armature; and this entire housing is moved by appropriate toggle mechanisms in one direction, so that the clutch mechanism may be re-engaged after tripping, and in the opposite direction to close the circuit breaker.

Accordingly, an object of my invention is to provide a novel high speed circuit breaker.

Still another object of my invention is to provide a latch-free clutch-controlled circuit breaker.

A further object of my invention is to provide a latch-free circuit breaker in which a holding magnet pull can be multiplied 12 times in the spring pull for opening the circuit breaker contacts.

Another object of my invention is to provide a holding magnet circuit breaker having a predetermined leverage.

There are other objects of my invention which together with the foregoing will appear in the specification and drawings, in which.

Figure 3:
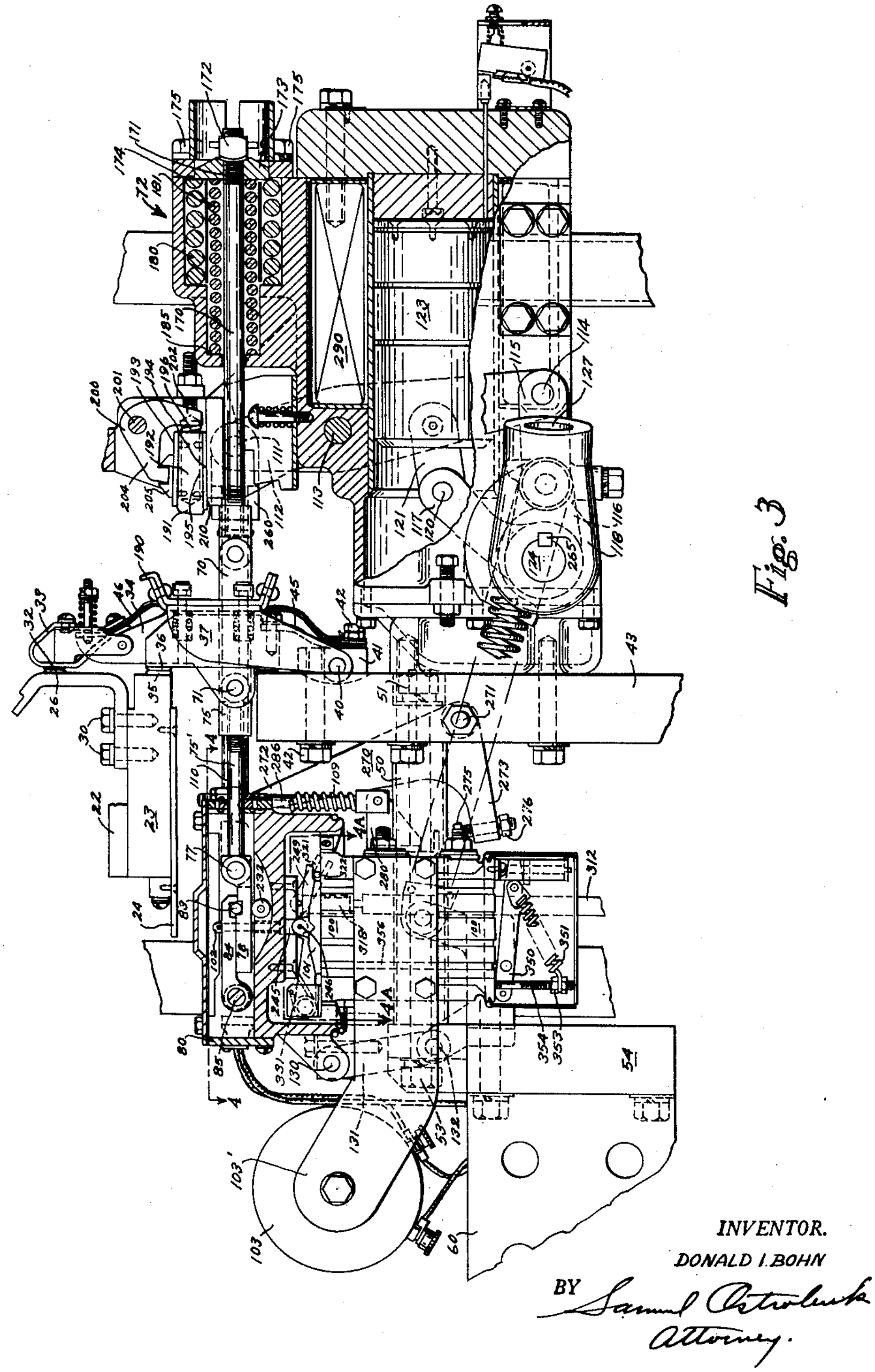
Figure 3 is a side view, partly in cross section, of the clutch and magnet mounting and operating mechanism of the circuit breaker of Figure 1.
Figures 4, 4A:
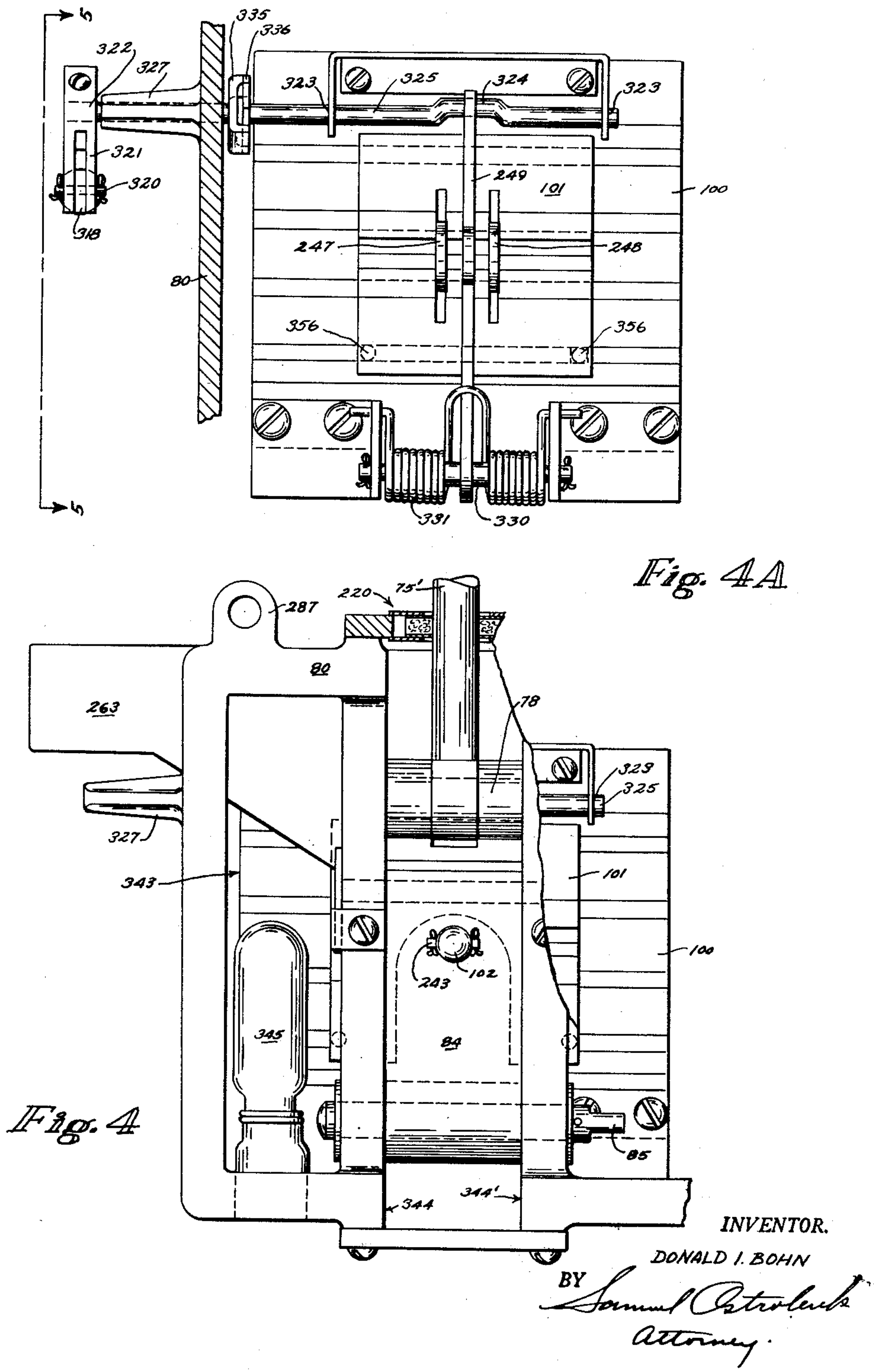
Figure 4 is a top view of the magnet and clutch housing taken from line 4—4 of Figure 3.

Figure 4*a* is a top view of the magnet and armature assembly taken from line **4*a*—4*a*** of Figure 3.

Figure 5:
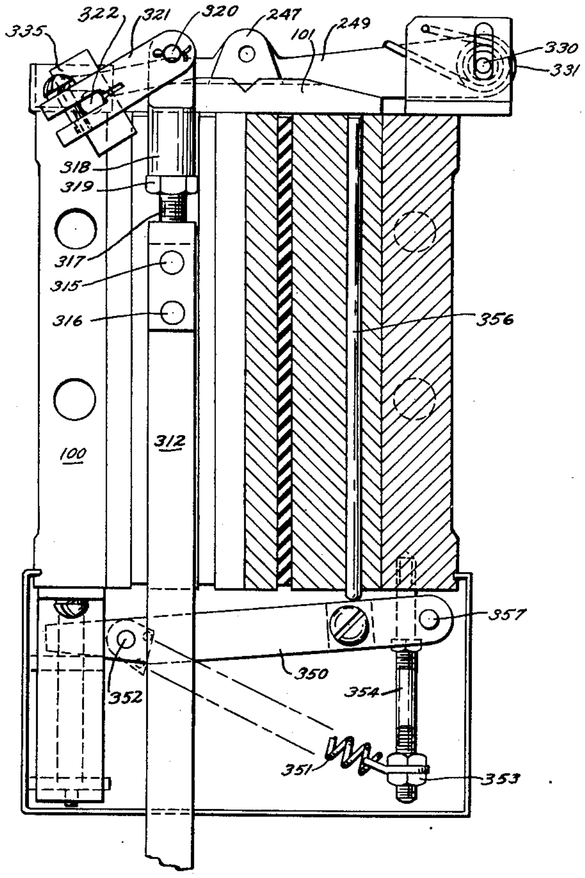

Figure 5 is a side view of the magnet of the operating mechanism of Figure 3 and is taken from line 5—5 of Figure 4*a*.

Figure 1:
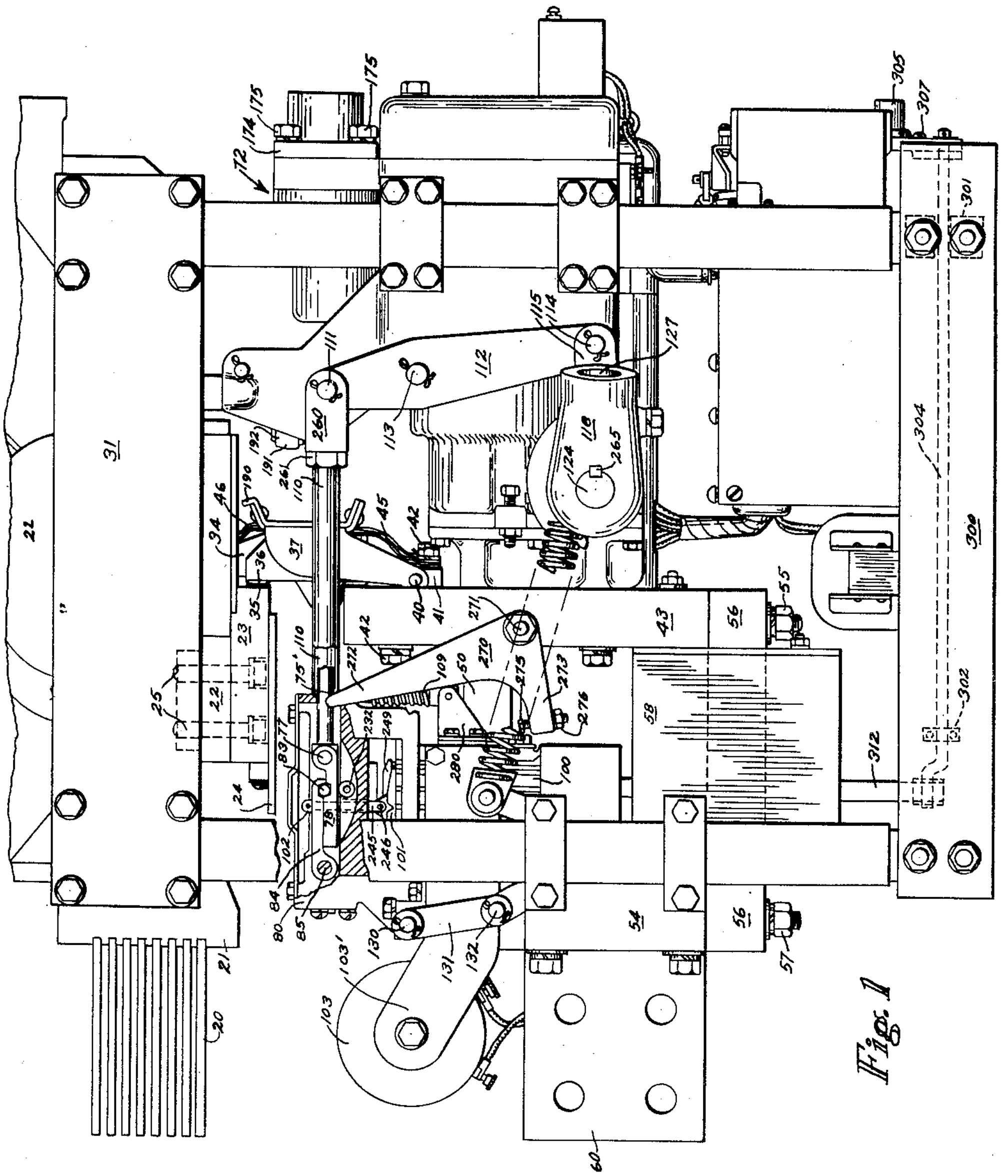
Figure 1 is a side elevation, partly broken away, of my novel circuit breaker showing the elements thereof in the closed circuit position.
Figure 2:
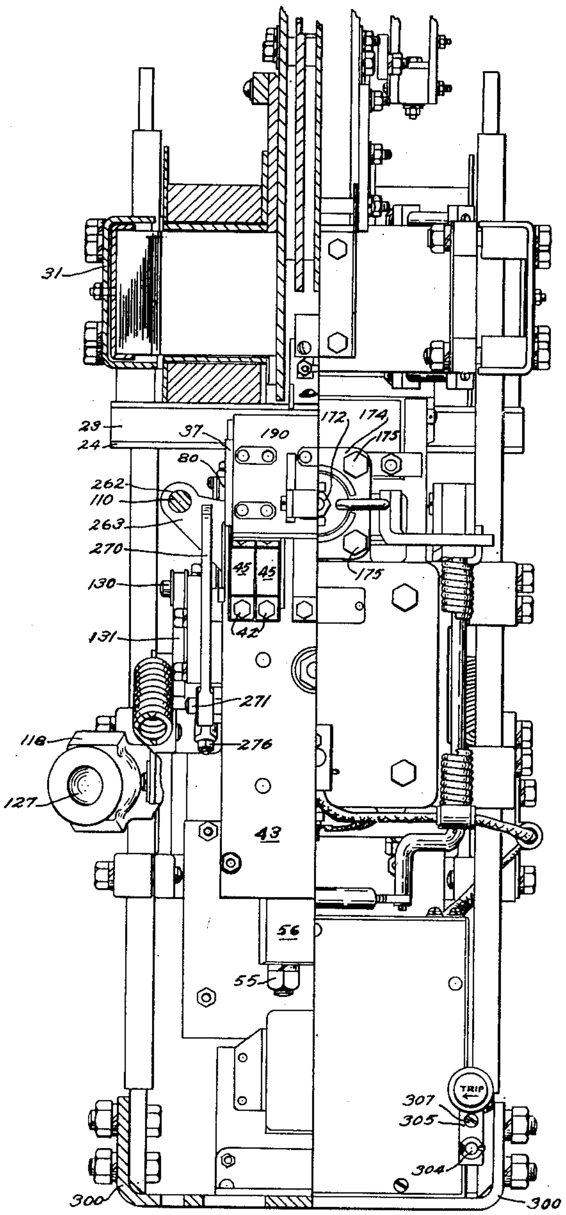
Figure 2 is a front elevation, partly broken away and partly in cross section, of the circuit breaker of Figure 1.
Figure 5A:
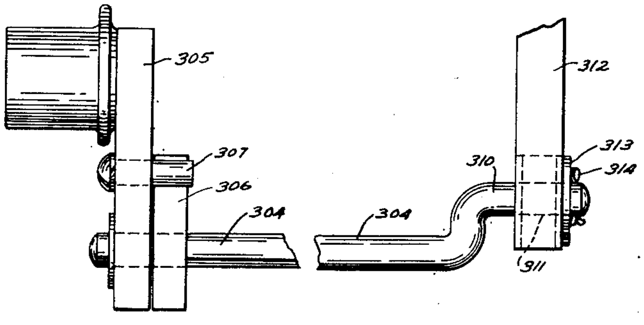

Figure 5*a* is a fragmentary view of a portion of the manual trip mechanism indicated in the lower dotted line portion of Figure 1.

Figure 6:
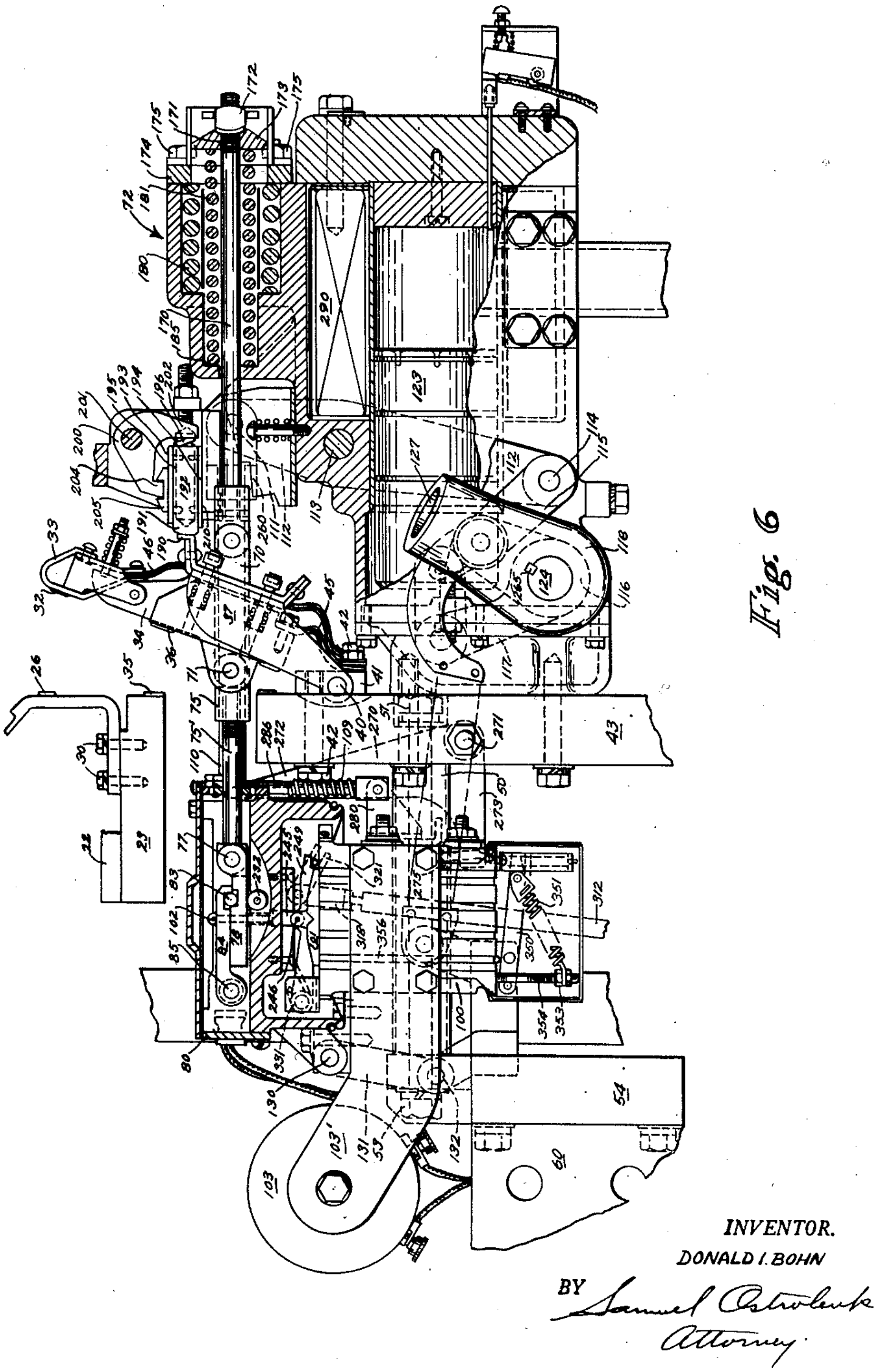

Figure 6 is a view corresponding to that of Figure 3 showing the members, however, in the open circuit position with the clutch fully reset.

Figure 7:
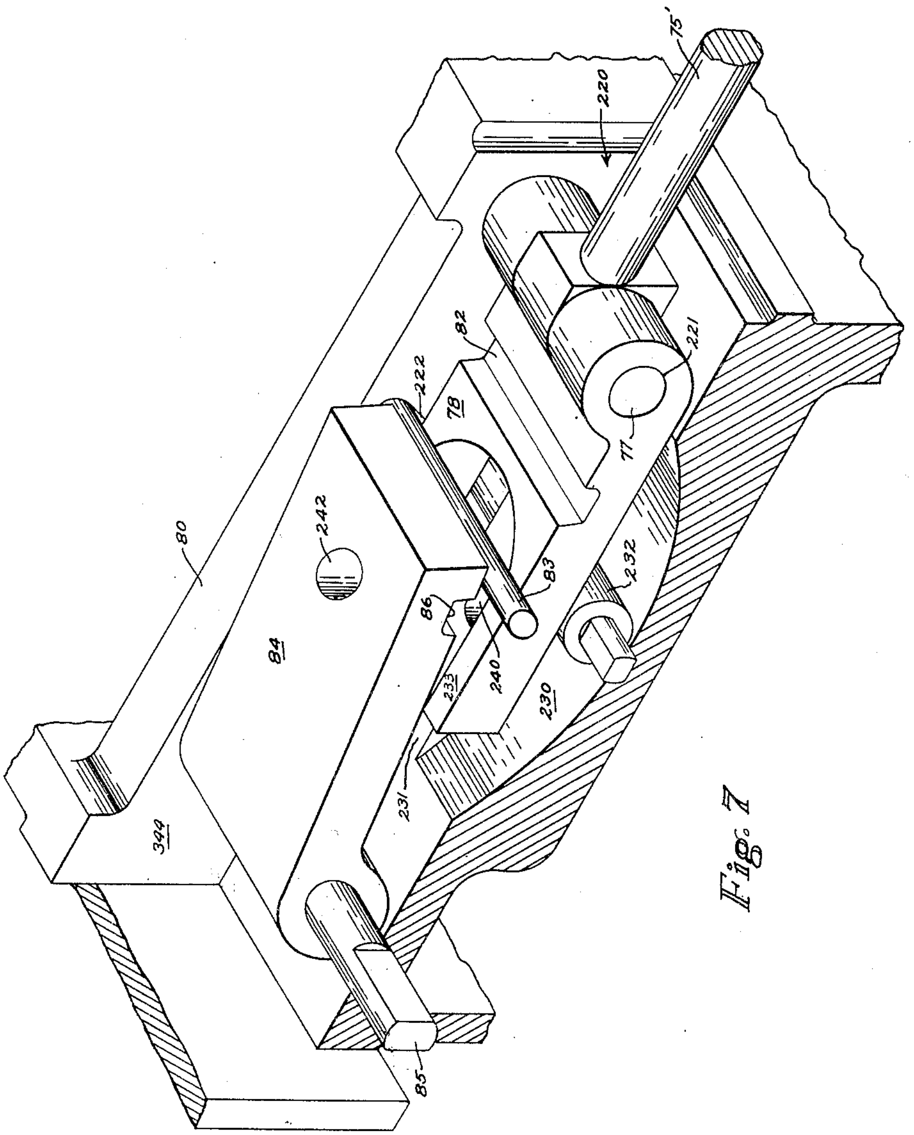

Figure 7 is a view in perspective of the clutch elements.

Figure 8:
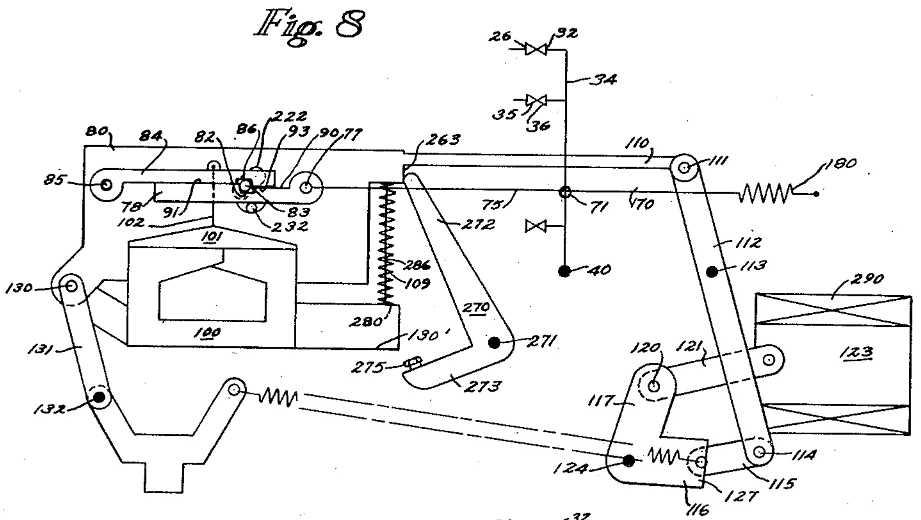

Figure 8 is a schematic view showing the closed circuit position of the clutch and operating members and corresponds to Figure 3.

Figure 9:
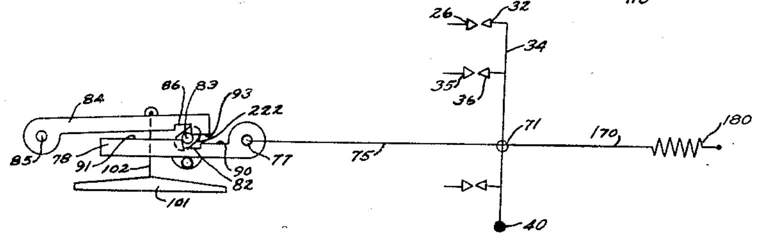

Figure 9 is a schematic view showing the initial tripping operation when the clutch is released.

Figure 10:
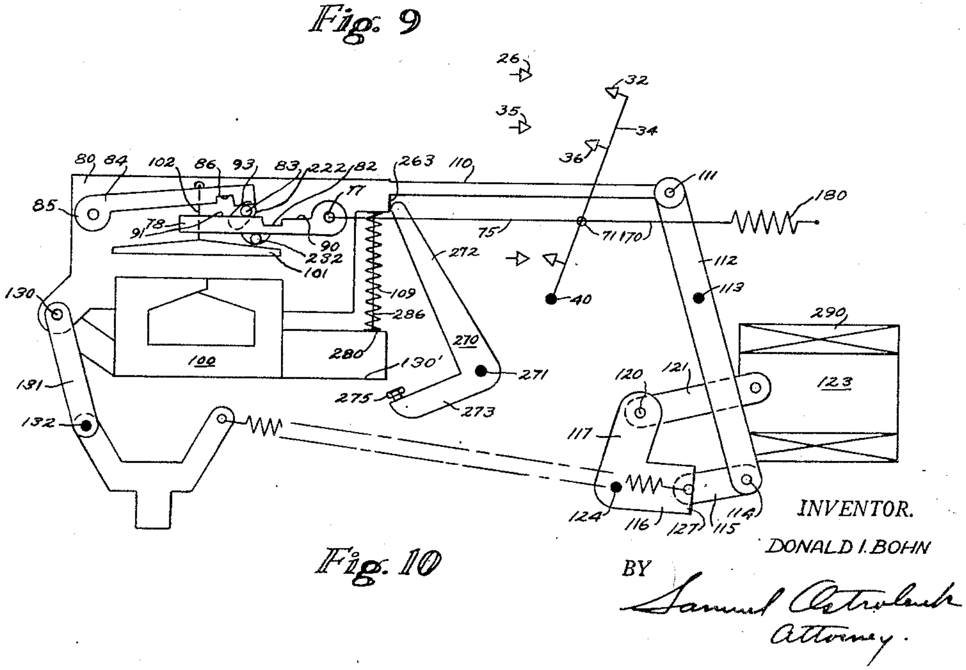

Figure 10 is a schematic view showing the clutch and operating parts moved to the full open position.

Figure 11:
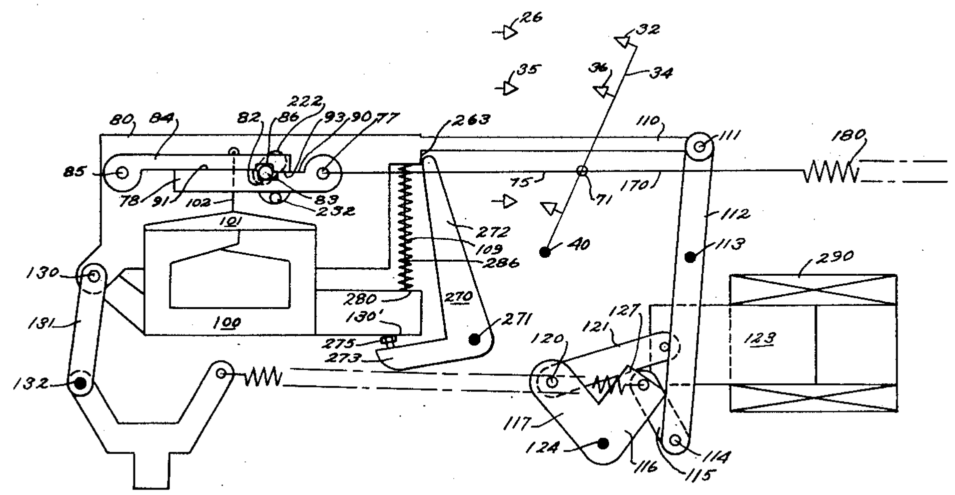

Figure 11 is a schematic view showing the clutch and operating parts in the full open position of Figure 6 with all of the elements reset and ready to be closed.

Figure 12:
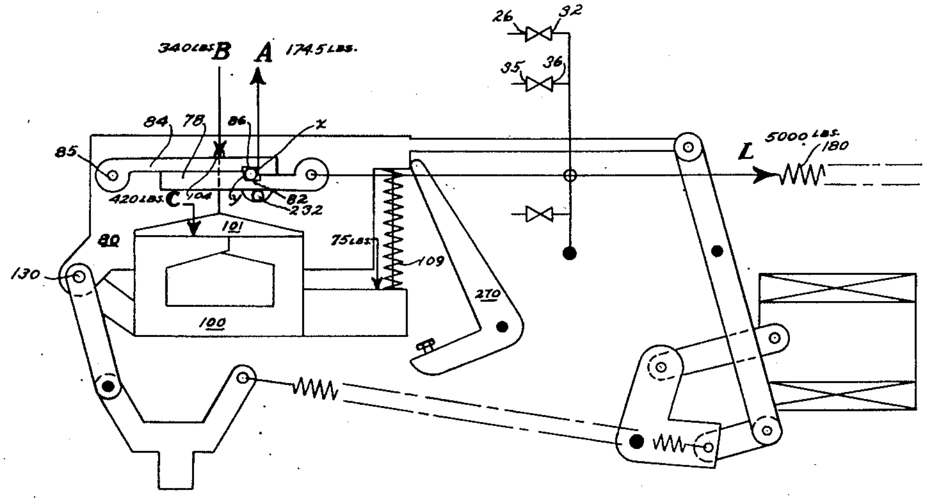

Figure 12 is a view corresponding to that of Figure 8 showing the relationship among the various forces applied to the clutch mechanism.

Figure 13:
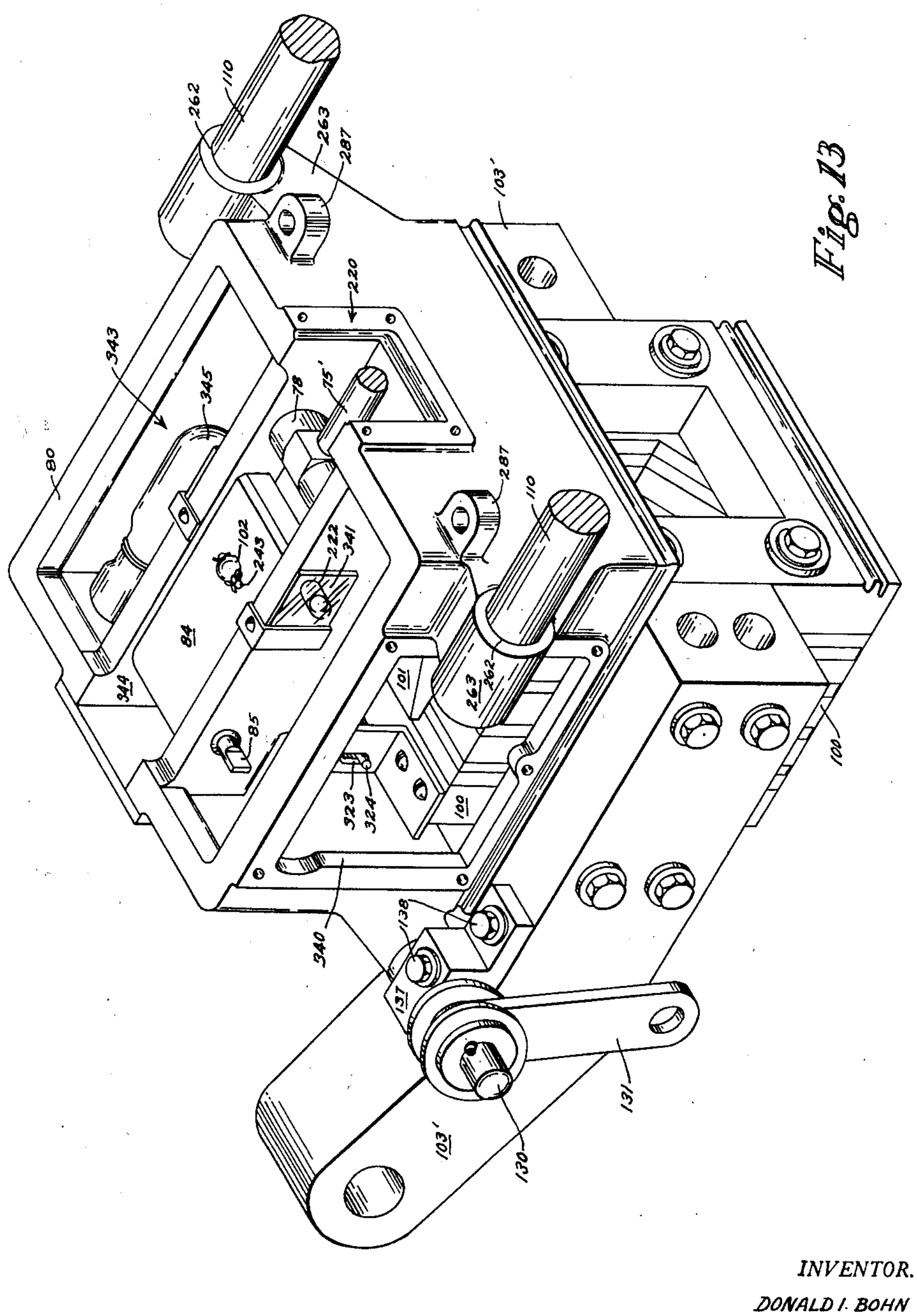

Figure 13 is a view in perspective of the housing for the holding magnet, the clutch and associated parts.

Figure 14:
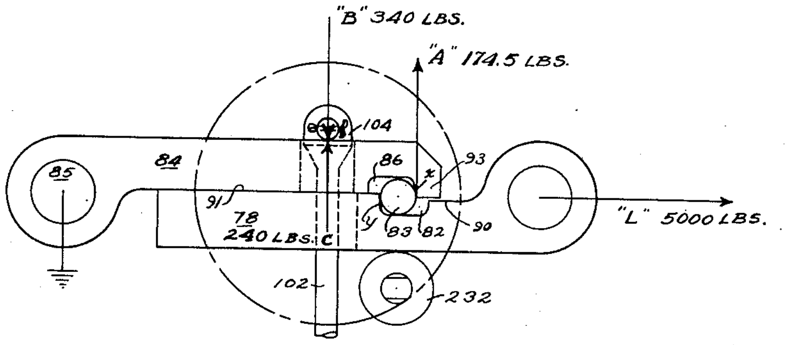
Figure 15:
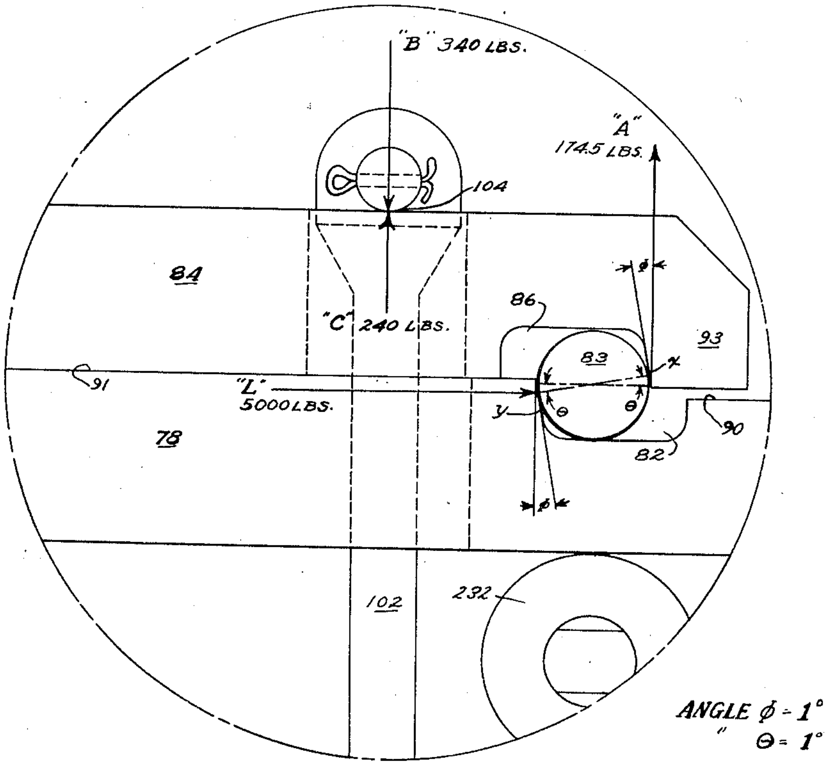

Figures 14 and 15 are greatly enlarged schematic views of a portion of Figure 12.

Figure 16:
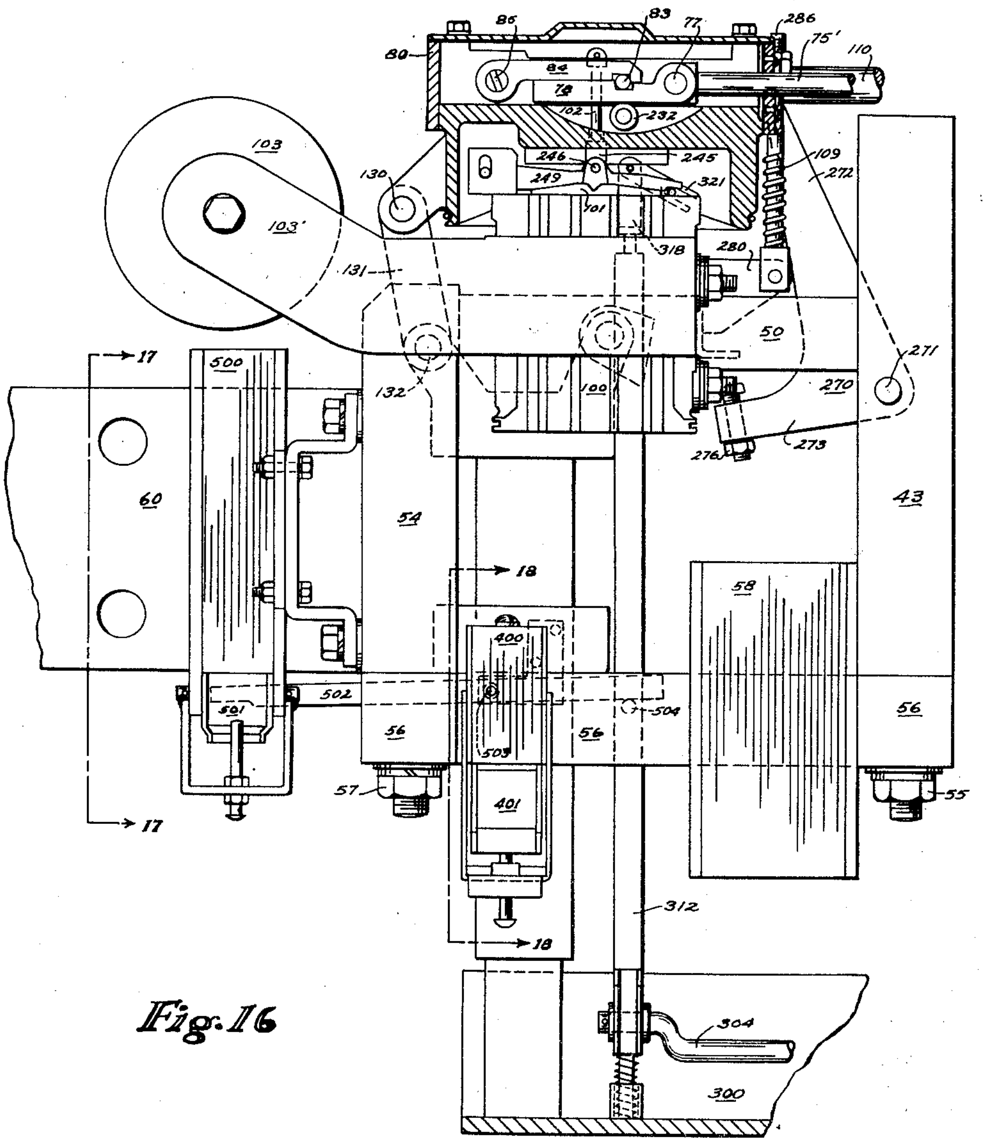

Figure 16 is a view partly in cross-section showing a novel modified selective tripping device for use with my invention..

Figure 17:
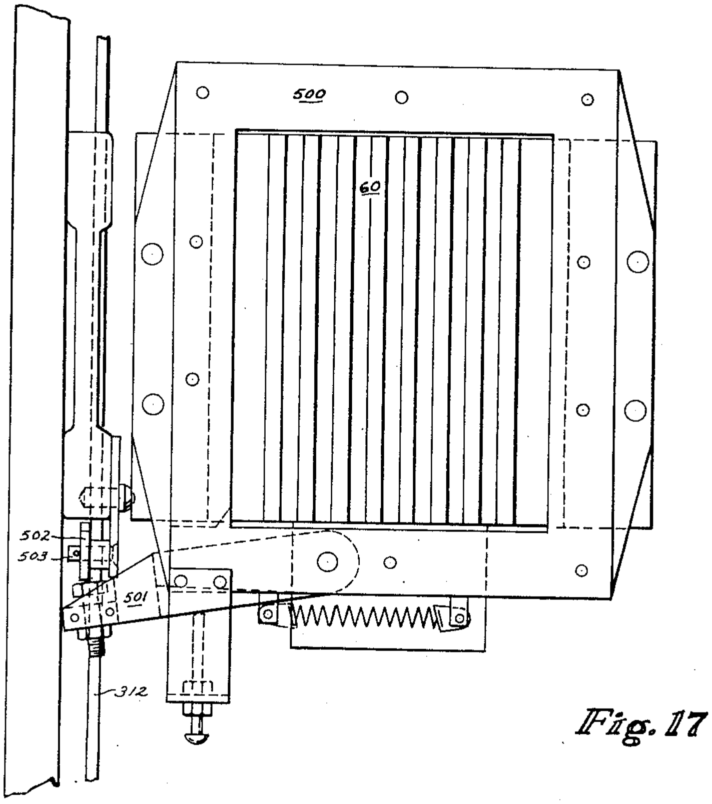

Figure 17 is a view partly in cross-section taken on line 17—17 of Figure 16 looking in the direction of the arrows.

Figure 18:
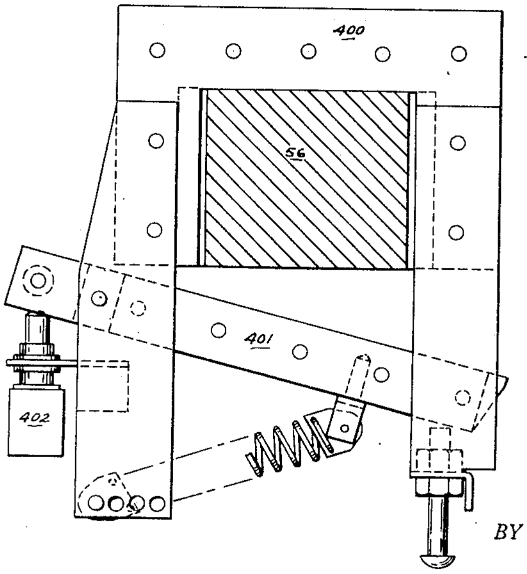

Figure 18 is a view partly in cross-section taken on line 18—18 of Figure 16 looking in the direction of the arrows.

The fundamental novel construction of my circuit breaker is shown in Figures 8 to 11.

Here we have shown schematically fixed movable and arcing contacts 26 and 35 engaged respectively by the movable contacts 32 and 36 carried on the pivoted arm 34. Arm 34 is secured at 71 to the spring operated arm 170, one end of which is secured to a spring 180 tending to move arm 170 to the right to effect disengagement of the contacts.

The other end of arm 170 is secured through extension 75 to the member 78 having a notch 82 in which there is seated a roller 83. The roller 83 also seats in a notch 86 of a pivoted arm 84.

It will be obvious that so long as the roller 83 is seated in the two complementary notches 82 and 86, it acts as a stop to prevent the spring 180 from effecting disengagement of the contacts.

The spring 180 acting through arms 170, 75 and 78 urges the left hand side of notch 82 against the roller 83, tending to move the roller to the right until it engages the right hand wall of the notch 86. This is the condition obtained in Figure 8.

The right hand edge of notch 86 engages the roller 83 at a point which is slightly above the horizontal diameter of the roller 83. Thus the force of the spring 180 may be regarded as made up of two components, the larger component exerting a force against the roller 83 pressing it against the right wall of notch 86, of pivoted arm 84. The other component tends to rotate the roller 83. This component force may be made very small by bringing the plane of the line of contact of notch 82 to spring 180 close to the center of the roller 83.

In order to overcome this rotative force and to hold the roller 83 in the notch where it acts as a stop, the holding magnet 100 through its armature 101 and link 102 engages the pivoted arm 84. The hold-down springs 109, hereinafter described, which engage the magnet, then exert a downward pull on the magnet and hence on the pivoted arm 84. This downward force need only be just sufficient to overcome the small rotative component of the spring 180. Accordingly, a considerable force multiplication between the magnet pull and spring force may be secured which in practice has been made more than 1 to 12; i. e., a spring force of 5000 lbs. tending to pull the contacts open is opposed by a downward pull of 340 lbs.

This structure, as above pointed out, requires the exact alignment of the notches with a specific line along the roller. Therefore link 102 must be so arranged as not to interfere with this alignment. This is accomplished by floatingly supporting the magnet in the manner hereinafter described and by biasing the magnet downwardly by springs which exert a force on the magnet away from the armature with a pull equal to or slightly less than the magnet pull on the armature, i. e., 340 lbs. The magnet structure thus automatically positions itself to maintain a force, through link 101 and arm 84, of 340 lbs. to hold the roller against rotation.

The instant the pull of the magnet 100 on the armature 101 is neutralized due to the circuit conditions, the downward pull of 340 lbs. on the arm 84 is released and the pull of the spring 180 is immediately released to roll the roller 83 out of the notch and to effect disengagement of the contacts as shown in Figure 10.

The complete operation of this clutch and the manner in which it is reset may be more fully understood from a description of the circuit breaker as a whole.

In Figures 1, 3 and 6, I have shown a circuit breaker having generally the construction and operation shown in Patent No. 2,150,566 to William M. Scott, Jr., and assigned to the assignee of the present application in which the holding magnet of the type shown in application Serial No. 452,613, filed January 3, 1941, is incorporated.

Current enters through the upper back connection stud 20 (Figure 1) then flows through the bus connection 21 and blow out coil 22 to the upper main stationary contact carrying block 23 which is secured to the blow out structure housing 31 by cap screws 25.

A stationary arcing contact 26, which is preferably L-shaped, is secured by means of the bolts 30 to the upper surface of the main contact carrying block.

Current reaching the upper stationary contact carrying block 23 passes through the stationary arcing contact element 26 to the movable arcing contact element 32 mounted on the movable contact 33 which, in turn, is mounted on the main movable contact carrying arm 34.

Current also flows from the stationary contact block 23 to the main stationary contact element 35, thence to the main movable contact element 36 mounted on the movable contact block 37, which also is mounted on the main movable contact carrying arm 34.

Main movable contact arm 34 is pivotally mounted on the pivot shaft 40 which is carried by the conductive supporting elements 41. The conductive supporting elements 41 are in turn secured by the bolts 42 to the lower main stationary contact carrying block 43. An appropriate current carrying connection between the main movable contact and the conductive supporting elements 41 and thus to the bus connection 43 is obtained by the pigtail 45; and an appropriate current carrying connection between the main contact and the arcing contact is obtained by the pigtail 46.

Current from the lower main stationary contact carrying block 43 is divided so that a portion thereof flows through the bucking bar 50 which is connected to the lower main stationary contact carrying block 43 by the bolts 51.

The bucking bar 50 passes through the magnet 100 and the magnet housing 80 in the manner hereinafter described and is, by means of a bolt 53, secured to the upper end of conductor 54.

The lower end of the lower main stationary contact carrying block 43 is by means of a bolt 55 (Figure 1) in current carrying engagement with the conductor 56 which, in turn, is connected to the conductor 54 by the bolt 57. Current is then led from the conductor 54 through the back connection stud 60 suitably insulated from stud 20.

Consequently, when the contacts are in the closed circuit positions of Figures 1 and 3, current flows from the upper back connection stud 20 through the main and arcing contacts and then divides to flow through the bucking bar 50 and the lower conductor 56 to the lower back connection stud 60.

The lower conductor 56 may be surrounded by iron laminations 58 to provide a by-pass for the current passing through the bucking bar 50 providing a rate of current rise response for the magnet as more fully set forth in Patent No. 2,092,592 of William M. Scott, Jr., assigned to the assignee of the present application.

The main principles of my present invention and the manner in which it is embodied in my novel circuit breaker are shown schematically in Figures 8, 9, 10 and 11, and a preliminary description of the schematic illustrations will simplify the description of the actual physical embodiment. The principle of operation of the clutch roller 83 has already been described. The exact relationship of the clutch to the remainder of the mechanism will now be set forth.

In the schematic illustration of Figure 8, the elements of the circuit breaker are shown in the closed circuit position. The arcing contacts 26 and 32 correspond exactly to the arcing contacts 26 and 32 of Figures 3 and 6. The main contact elements 35 and 36 of Figures 8 correspond exactly to the similarly numbered contacts of Figures 1, 6, and 3.

The movable arcing contact 32 and the movable main contact 36 are mounted on the contact carrying arm 34 which is pivoted on pin 40.

Still referring to Figure 8, the link 170 is pivotally connected at 71 to the contact carrying arm 34 and at its opposite end is connected to the spring 180.

Spring 180 exerts a biasing force on link 170 tending to pull it to the right and, therefore, exerts a clockwise bias on the contact carrying arm 34, thus tending to open the contact members. This opening bias on the part of spring 180 is resisted by means of link 75 also pivotally connected at one end to the pin 71 and at the opposite end pivotally connected to the pin 77 of the lower clutch member 78.

The lower clutch member 78 is mounted in a manner hereinafter described so that it may slide longitudinally from the position shown in Figure 8 within the housing 20 to the position shown in Figure 10 still within the housing.

When the lower clutch member 78 is released from the engagement with other elements of the clutch, hereinafter described, then no further resistance will be offered to the bias of the spring 180, and the spring may then move the clutch element 78 from the position of Figure 8 to the position of Figure 10, thus moving the movable contacts in the manner shown.

The lower clutch element 78 is provided with a detent 82 of substantially rectangular cross-section in which is mounted the roller 83.

An upper clutch arm 84 is pivotally mounted within the housing on the pin 85 and is likewise provided with a detent 86 which engages the upper portion of the roller 83.

As long as the upper pivotal arm 84 is held down in the position shown in Figure 8, then the interengagement of these arms 84 and 78, by reason of the roller 83 resting in the complementary detents, prevents the longitudinal movement of the roller 83, and clutch member 78, and hence prevents the spring 180 from being effective to separate the contacts.

When the holding force applied to the upper pivotal arm 84 is released, then the bias of spring 180 will be effective to produce the results shown in Figures 9 and 10; that is, first the roller 83 will be rolled out of the complementary detents 82 and 86 onto the surfaces of the members 78 and 84, thus causing the clutch arm 84 to rise; and then as the roller is completely freed from the detents by this operation, the spring 72 is permitted to be effective to move the elements further from the position shown in Figure 9 through to the position shown in Figure 10 where the contacts are open.

I have found that by this arrangement a holding force of less than $\frac{1}{12}$ of the opening bias need be used to maintain the circuit breaker closed.

Thus, while the downward pull applied to the arm 84 is of the order of 340 pounds, it will safely retain the contacts in the closed position even though the opening bias of the spring 180 is of the order of 5000 pounds.

In actual practice, I have found that this 5000 pound opening force may be resisted by the 340 pound holding force where the lower clutch members have a cross section of ½ inch by $1\frac{1}{16}$ inches and where the roller has a diameter of 0.280 inch. The actual embodiment of the clutch elements is shown in the perspective view of Figure 7 where the size thereof has been exaggerated; while the drawing of Figure 1 shows the elements reduced in scale.

It will be seen from an examination of Figures 14 and 15 that the upper surface 90 of the clutch member 78 to the right of the detent is lower than the surface 91; while the upper pivoted member 84 of the clutch has a larger downward extension 93 beyond the detent. The extension 93, thus defining the outer wall of the detent 86, extends below a horizontal diameter of the roller 83. The left hand side of the detent 82 in the lower member 78 extends above the same horizontal diameter of the roller on the other side thereof.

Assuming that little or no force is applied to hold the arm 84 down while the full opening bias of spring 180 is effective on the lower member 78, and assuming that the arm 84 is freely rotatable upwardly around the pin 85, it will be obvious that the successive results shown in Figures 8, 9 and 10 will occur; that is, the roller will roll up the left hand side of detent 82 and down the right hand side of detent 86 in response to the longitudinal pull on the member 78 in the manner previously explained.

But, when a downward pull is exerted on the upper clutch arm 84, the pull on member 78 is transmitted from the left hand side of the detent to the roller 83 and from the roller 83 to the right hand side of detent 86; and since the right hand side of the detent 86 is substantially tangential to an imaginary circle drawn about the shaft 85 as a center, and since the pull is thus normal to the initial direction of movement of the arm 84, a relatively small force is all that is necessary to restrain the arm 84 from rising despite the fact that a relatively great force is exerted on the member 78.

However, and this has been demonstrated by the fact that, in an actual commercial embodiment of my invention the holding force which holds down the arm 84 exerts less than one-twelfth the pull exerted by spring 180 (340 lbs. to 5000 lbs.), when the holding force is released from the arm 84 the successive results shown in Figures 9 and 10 occur.

As may be seen in the enlarged views of Figures 14 and 15, the faces of the detents which engage the roller 83 are ground at an outward angle $\theta$ of the order of one degree in order to create a positive component force that will tend to push the clutch members apart.

Circuit breakers thus constructed have withstood successive practical and commercial interrupting tests at high speed. As a matter of fact, from an oscillograph it has been determined that the contacts are fully separated by ⅓ cycle and that the time from the occurrence of overcurrent conditions to current zero is 0.7 of a 60 cycle wave.

The releasable holding force which is utilized to hold down the pivotal arm 84 is the magnet 100 and the armature 101. The springs which in turn hold down the magnet ensure engagement of the clutch members. Armature 101 is connected by means of link 102 to the pivotal arm 84; and when the said armature is in engagement with the face of the magnet 100, as shown in Figure 8, the upper pivotal arm 84 of the clutch is held down by the magnet and hence by the magnet springs and the circuit breaker is either in closed position or ready to close.

In Figures 14 and 15, I have shown greatly enlarged views of the clutch mechanism of Figure 12, showing the relationship of the forces involved. Where the clutch member 78 bears against roller 83 at point $y$ at an angle $\theta$ of 1° from the horizontal, then the tangential rotative component is sin 1° times 5000 or 87.25 lbs. The tangential rotative component at point $x$ is likewise 87.25 lbs. and clutch member 84 must be held down with a force of more than 174.5 lbs., since the clutch member 78 is restrained from downward movement by the roller 232, and thus adds its component force to the upper clutch member 84 at point $x$, it thereby gives an upward force at A of 174.5 lbs. The spring 109 holding down magnet 100 exerts a force B due to various leverages of 340 lbs. which is sufficient to counteract the opening component A of 174.5 lbs.

In order that the downward force B of spring 109 should not separate magnet 100 from armature 101, the magnet 100 is arranged to exert a holding force C of 420 lbs. on the armature, which force is thus greater than the force B. Force C is the releasable force, since on the occurrence of predetermined conditions, C will drop to less than 174.5 lbs. and will permit the clutch elements to separate.

The magnet 100 and the armature 101 may be constructed exactly as shown in Patent No. 2,412 247, filed July 28, 1942, assigned to the assignee hereof.

The magnet 100 which is energized by the shunt coil 103 also has a bucking bar 50 which will counteract the effect of the shunt coil on the occurrence of a reverse current, and will thus release the armature exactly in the manner described in the aforesaid application.

The magnet 100 is mounted in the housing 80 and the upper portion 84 of the clutch, the armature 101, and the magnet 100 and all its associated parts are movable with the housing 80. The bucking bar 50 passes through the magnet 100 below the housing 80 so as not to interfere with the operations hereinafter described.

When the circuit breaker has tripped so that the elements are moved from the position of Figure 8 to the position of Figure 10, it is necessary to reset the clutch in order to re-engage the same so that the circuit breaker may close. For this purpose, the housing as a whole is moved from the position of Figure 10 to the position of Figure 11 wherein the contacts are still open, but the circuit breaker is prepared for a closing operation.

The housing 80 carries a link 110 which is pivotally secured at 111 to the upper end of the lever 112. Lever 112 is pivotally mounted on the pin 113, and at its lower end is pivotally connected by means of the pin 114 to link 115, which in turn is in toggle relation with the link 116.

Link 116 is pivoted on pin 124 and is provided with an integral extension 117 which is pivotally connected at 120 to the link 121, which in turn is pivotally connected to the solenoid armature 123.

The end 127 of handle socket 118 opposite the shaft 124 is provided with a socket to receive a handle so that the breaker may be manually operated and adjusted.

It will now be clear that when the handle is inserted in the end 127 of handle socket 118 (when the members are in the position shown in Figure 10) and rotated in a counterclockwise direction, links 116 and 115 will move from the position shown in Figure 10 to the toggle position shown in Figure 11.

Lever 112 will thereby be rotated in a clockwise direction, thus pulling the housing 80, through the link 110, toward the right from the position shown in Figure 10 to the position shown in Figure 11. This is made possible by reason of the fact that the housing 80 is floatingly supported—one end thereof being supported by the extension 110 carried by the pivots 111 at the top of the opposite levers 112—the opposite end thereof carrying a pin 130 on which is pivotally mounted on opposite sides the links 131 which are in turn pivotally mounted on stationary pins 132, 132.

The link or support 131 may rock about shaft 132 from the position of Figure 10 to the position of Figure 11 and then back again to the position of Figure 8 as shown in the schematic views of Figures 8 to 11.

Thus, when the lever 112 is rotated in a clockwise direction, the housing 80 as a whole moves to the right.

The center line distance from the fulcrum 113 of the lever 112 to the supporting pin 111 thereof is equal to the length of the pin centers of link 131 so that these members will rock simultaneously and define at all times two sides of a parallelogram; the housing 80 may, therefore, not only be moved longitudinally but also be rocked upwardly during a portion of its movement.

Thus, when the housing 80 moves from the position of Figure 10 to the positon of Figure 11, means hereinafter shown are provided which lift the magnet 100. The magnet 100 during this movement is thus brought up to the armature 101 and engages the same, so that at the completion of the movement from Figure 10 to Figure 11, the clutch is reset and the armature 101 re-engaged with the magnet 100.

Thus, when the handle, inserted in the socket end 127 of the handle socket 118, is rotated clockwise from the position of Figure 11 to the position of Figure 8, the entire housing 80 with the clutch therein in engaged position is moved to the left and thus pulls the movable contact members from open to closed position against the bias of the spring 180.

The links 116 and 115 in the course of such closing movement move over center so that the opening bias of the spring will be ineffective to collapse them to the position shown in Figure 11.

As is also obvious, the link 116 may be rocked from the position of Figure 11 to the position of Figure 8 by means of a solenoid armature 123 which pulls on the link 121 to pull the extension 117 clockwise and thus rotate the link 116 which is integral with the extension in the clockwise position from the position of Figure 11 to the position of Figure 8.

The physical embodiment of the elements thus described will now be clear from an inspection of Figures 1 to 7.

Referring again to Figures 1, 3, and 6, the link 70, between contact arm 34 and spring 180, is a compound adjustable member having an additional element 170 which is threaded into the end of link 70, and the opposite end of which is also threaded at 171 to receive an adjusting nut 172 which maintains the plunger 173 in suitably adjusted position.

The spring contained within the housing 72 is a compound compression spring consisting of a plurality of outer turns of a heavy spring 180 which bears at the left hand end against the inner annular surface of the housing 72 and which at its right end bears against the periphery of the plunger 173.

In order quickly to initiate an arc, extremely high initial acceleration is necessary. To this end, initial acceleration at very high rate is largely produced by the heavy powerful spring 180 which is pre-stressed or maintained under substantial compression even with the circuit breaker in the open position.

Since the force of spring 180 is largely dependent upon its pre-stressed condition for the high initial rate of acceleration, it is effective only during the first part of the opening movement of the bridging member.

To this end, as shown in Patent No. 2,150,566 of William M. Scott, Jr., the plunger 173 has a plurality of arms which register with a spider 174 held in position against the housing 72 by the bolts 175. The arms of the plunger 173 are thus acted upon by the heavy spring 180 until they pass through the interleaving portions of the spider plate 174, which latter members then take the stress of spring 180.

Preferably, the spring 180 is effective until all of the upper contact surfaces are separate from their associated surfaces.

During the remaining opening movement, the lighter spring 181, which is compressed between the annular interior 185 of the housing 72 and the face of the plunger 173, passes through the central opening in the spider plate 174 and continues to press against the plunger to ensure a high speed full opening movement of the circuit breaker.

Due to the high speeds involved and the resultant magnitude of the kinetic energy, it is desirable to decelerate the movable structure, as the fully open position is obtained by means of an energy absorber and dissipator. This energy absorber is preferably the type in Patent No. 2,137,001 of George A. Healis and in the above-mentioned Patent No. 2,150,566 of William M. Scott, Jr.

Briefly, the movable contact arm 34 is provided with impact members 190, preferably of hardened steel, arranged to engage an inclined surface 191 of a brake-block 192. The brake-block 192 is provided with friction surfaces 193 and 194 along the upper and lower horizontal surfaces thereof and with a recess 195 to receive an end of the compression spring 196.

A crank arm 200 is pivotally mounted on the frame at 201. One arm 202 thereof is engaged by the opposite end of compression spring 196; while the opposite end 204 of the crank arm bears against a brake shoe 205 which cooperates with the friction surface 193.

As the impact members 190 engage the inclined surface 191, a component of force is effective to press the brake-block 192 firmly against an upper surface 210 of the housing. As the block is displaced to the right, the spring 196 is compressed, and applies through the crank arm 200 a rapidly increasing force upon the brake-shoe and the friction surfaces 193 and 194.

In this manner, the kinetic energy of the moving parts is quickly absorbed and rapidly dissipated to prevent rebound of the moving contact arm and to eliminate damaging shocks and hammer blows to the parts of the circuit breaker.

Additional energy absorbing means may be provided as the particular commercial application of the circuit breaker may dictate.

The link 71 carried by the contact carrying arm is also provided with the extension 75. This extension is provided with a threaded socket into which the additional link 75′ is inserted.

Link 75′ passes through opening 220 in the housing 80 and, as shown in Figures 7 and 13, is rotatably mounted on the pin 77 carried in the bearings 221, 221 of the lower clutch member 78.

The clutch member 78 of Figures 1, 3, 6, and especially 7, is provided with the detent 82 which cooperates with the roller 83 and which in turn cooperates with the detent 86 in the upper pivoted clutch member 84, which in turn is pivoted on the shaft 85.

As will further be seen from Figures 7, 9 and 10, the roller 83 is retained in position, so that it may freely move to the various tripped and closing positions without moving out of engagement with the other clutch elements, by means of the slots 222 in opposite sides of the housing 80. These slots 222 are sloped and shaped so that the roller 83 may move to all of the positions shown in Figures 8 to 11, although it is restricted against any other movement. Slots 222 are also sloped so as to guide the roller 83 to the appropriate reset position of Figure 11 when the housing 80 is moved from the position of Figure 10 to the position of Figure 11.

As is obvious from Figure 7, the upper portion of the housing 80 is provided with a recess 230 on each side of a plane surface 231 on which clutch member 78 rests. A roller 232 is mounted in each recess 230 to provide a relatively frictionless glide for the lower clutch member 78. The left hand end of the lower clutch member 78 (with respect to Figure 7) is bifurcated to reduce its weight and allow it to clear the connecting link 102 The machined side walls 344, 344′ of the housing 80 keep the clutch member 78 in proper alignment so that the detent 82 is always parallel to the roller 83.

The alignment of the detent 86 of the upper pivotal member 84 is assured by reason of the mounting of that member on the continuous shaft 85.

The surface 231 of housing 80 is provided with a hole 240 through which passes the link 102 (Figures 3 and 6) that connects the pivotal member 84 of the clutch and the armature 101.

The upper end of link 102 passes through the opening 242 in the upper pivotal member 84 of the clutch and is held in position by pin 243 which passes through a horizontal opening in the upper end of link 102 and is frozen therein. The lower end of link 102 is bifurcated at 245 which, by means of a pin 246, is secured to the upwardly extending lugs 247 and 248 of the armature 101 (Figure 4a) and also to the biasing arm 249 of the armature (hereinafter described).

The members 247, 248 and 249 are secured to the armature in any suitable manner, preferably by welding. The armature has the shape and operation previously described in connection with Patent No. 2,412,247, above mentioned, and is held by a magnet also of the type previously described.

The magnet 100 is provided with the independently energized shunt coil 103 which creates the initial bias thereon to attract and hold the armature 101. The flux generated by the shunt coil 103 energizes the magnet by means of the pole pieces 103′ also in the manner described in the above mentioned application.

It will now be obvious that the distance from the upper surface of clutch member 84, where the armature link 102 engages it, to the pole face of the magnet 100, where the armature 101 engages the pole face, is critical. That is to say, when holding magnet 100 is energized and is holding the armature 101 against its pole face, the length of the armature 101 and the link 102 should be such that the upper clutch member 84 makes the exact necessary engagement with the roller in a straight line. In practice, we have found that the precision machinery necessary to secure this result is extremely difficult.

Accordingly, the magnet is in effect floatingly supported in order to take up any minute machine inaccuracies and to ensure good clutch engagement. To this end, the magnet is pivotally supported at one end in the housing 80. The opposite end of the magnet 100 is supported by means of the studs 286, 286 the upper ends of which are secured to the housing 80 by the abutments 287, 287 and the lower ends of which are fastened to the abutments 280, 280 which are attached to the surface of the magnet structure. The spring 109 between the abutment 287 and abutment 280 thus exerts a push of 75 lbs. tending to rotate the magnet 100 clockwise about its pivot 130 as seen in Figure 1. The magnet 100 and its armature 101, under the action of this spring 109, and the various leverages bring the clutch members into engagement with a force of 340 lbs. as determined and ensured by the spring 109. The above conditions exist on both sides of the magnet 100 but the force of 340 lbs. is the resultant force of both springs 109, 109 and the various leverages involved.

When the circuit breaker parts move from the closed circuit position of Figures 1 and 3 to the open circuit position shown schematically in Figure 10, the clutch member is disengaged as shown schematically in Figure 10.

The handle may then be inserted in the socket 127 to rotate the link 116 from the position shown in the schematic view of Figure 10 and the position shown in Figure 3 to the position shown in Figure 6. This rotation of link 116 causes the lever 112 to rotate in the manner previously described in connection with the schematic view, and thus through the connector 110 causes the magnet and armature housing to swing over toward the right on the pivotally mounted link 131.

As shown in Figure 1, the lever 112 is connected to link 110 by means of a short clevis 260. Clevis 260 is pivotally mounted on the pin 111 carried by lever 112 and is provided at its left hand end with a threaded socket in which the connector 110 may be screwed and tightened therein by means of a nut 261. The left hand end of the connector 110 may be likewise threaded into an opening 262 (Figure 2) in a lug 263 extending from the side of the housing 80.

The shaft 124 on which the link 116 is mounted passes laterally through the circuit breaker elements and is keyed to a link similar to the link 116 on the opposite side.

The handle socket element 118 need only be provided on one side, since only one handle is necessary for operation. The link 116 on each side is rigidly secured to shaft 124 by means of a key 265 which registers in matching keyways.

When the circuit breaker moves from the closed circuit position shown in Figure 3 to the tripped position of Figure 10, it is necessary not only to reengage the clutch, but to cause the armature 101 to reengage the surface of the magnet 100. For this purpose, the magnet 100 must be brought up to the armature 101.

This operation is obtained by means of the bell crank lever 270 (Figure 1) rotatably mounted at 271 on the conductor 43.

Bell crank lever 270 has an upper arm 272 which is interposed in the path of the lug 263 on the side of the housing 80. When the housing is pulled toward the right during the resetting operation, the lug 263 strikes the arm 272 and rotates the bell crank lever in a clockwise direction.

The lower arm 273 of the bell crank lever is provided with an adjustable screw abutment 275 which may be threaded through the end of the lower arm 273 and locked in place by the lock nut 276, the abutment being arranged to engage the lower surfaces of pole pieces 103'.

Consequently, when, by reason of the motion of the housing 80 toward the right, the bell crank lever 270 is rotated in a clockwise direction, the abutment 275 on the lower end 273 thereof is raised against the pole pieces 103' of the magnet 100 and lifts the magnet 100 to engage with the armature 101.

The adjustable screw abutment 275 is so arranged that this raising action of the magnet 100 will occur when the roller 83 and detent 86 of the pivotally mounted member 84 of the clutch move opposite the detent 82 in the lower member 78 of the clutch; it being remembered that the lower member 78 is stationary during the motion of the housing 80 toward the right.

When these elements thus move into registry, the roller 83 can drop into complementary registry with the detents 82 and 86, and the housing 80 and its magnet 100 can be raised into contact with the armature 101.

The magnet 100 is pivotally suspended from the pin 130 which passes through the bearing block 137—137 which in turn, are rigidly attached, by any suitable means, such as cap screws 138, to the magnet pole pieces 103'—103'. A vertical compression spring 109 guided by stud 286 is mounted between abutment 287 of the housing 80 and abutment 280 of the magnet 100. This spring 109 exerts sufficient force normally to hold the clutch member 84 down when the circuit breaker is closed; and thus may, as a safety factor, exert even more than 340 lbs. downward force. This does not interfere with the release of the armature 101 to permit tripping; but the spring 109 may be readily compressed, as above described, to raise the magnet 100 to engage the armature 101 preliminary to a reclosing of the circuit breaker.

As has previously been pointed out, in addition to the manual closing means, a solenoid closing means may be utilized which comprises the solenoid armature 123 actuated by the coil 290.

Thus, when the members have been reset in the position shown in Figure 6, the coil 290 may be energized to pull the armature 123 toward the right and close the circuit breaker in the manner previously described in connection with the schematic illustrations.

The circuit breaker is also arranged so that it may readily be manually tripped. This operation will be clear from an examination of Figures 1, 4*a*, 5, and 5*a*.

The base 300 of the circuit breaker is provided with appropriate bearings 301 and 302 to rotatably retain the longitudinal shaft 304.

The front end of shaft 304 is provided with a handle 305 which is rotatably mounted on the extension of the shaft 304 outside of the housing.

A lug 306 is keyed to the shaft 304 in any suitable manner, and a screw 307 is threaded through the handle and engages against one surface of the lug 306.

Rotation of handle 305 in a direction to bring screw 307 against lug 306 will rotate shaft 304; rotation of the handle in an opposite direction will have no effect.

The shaft 304 is provided with an eccentric crank element 310 which passes through an opening 311 in the lower end of the link 312, which link is secured on the crank element 310 by means of the washer 313 and the cotter pin 314.

The upper end of link 312 has secured thereto by means of the rivets 315 and 316 a threaded extension 317 which may be screwed into the threaded socket of the trip link head 318 and tightened therein by the nut 319. Trip link head 318 is pivotally secured at 320 to the bifurcated link 321.

Link 321 is secured to the shaft 322 which is rotatable in the bearing boss 327 of the housing 80. Shaft 322 is secured to yoke 335 which engages with the yoke 336 secured to shaft 325 which is rotatable in the bearings 323, 323.

An eccentric portion 324 of the shaft 325 underlies the lever or arm 249 of armature 101.

Rotation of shaft 304 by means of the handle 305 thus results in lowering of the link 312 which, in turn, rotates the bifurcated link 321, the shaft 322, and the yoke 335 which in turn rotates yoke 336 thereby turning shaft 325, thus lifting the eccentric portion 324 of shaft 325 and lifting the arm 249 of armature 101. The armature is thus pushed upwardly from the magnet.

As pointed out in the co-pending application previously referred to, the moment even a slight separation of the armature from the magnet occurs, the holding force on the armature drops, and the armature 101 is free to be pulled away from the magnet 100. It is obvious, of course, that the armature 101 is secured by the arm 249 on the shaft 330, and coil spring 331 biases the armature 101 toward the magnet 100.

An overcurrent trip may be provided, as shown in Figure 5, which comprises the armature 350 pivoted on the pin 357.

The free end of the armature 350 is ordinarily held down by means of the tension spring 351 connected between the pin 352 on the armature 350 and the adjustable lug 353 on the adjusting screw 354.

In the event of an overcurrent condition in a forward direction (rather than a reverse current condition), the armature 350 is attracted by the magnet 100 and rises toward the same against the bias of the tension spring 351. The armature 350 is thus brought into contact with the pin 356 which rides in a suitable slot in the magnet itself.

The upper end of pin 356 bears against the reverse current armature 101. Thus, when the forward overcurrent armature 350 is attracted to the magnet 100, the pin 356 is pushed up to push armature 101 away from the magnet 100, thus resulting in a tripping of the circuit breaker.

As shown in Figure 13, the housing for the magnet 100 and the various parts of the clutch is provided with an opening 340 on the outside through which the window 341 on the clutch housing may be used to inspect the clutch mechanism.

An opposite recess 343 in the housing is provided with a light bulb 345 to illuminate the clutch mechanism for inspection.

In the above described apparatus, actuation depends upon the direction and intensity of the current flow. From Figures 1 and 3 it will be seen that two paths 56—56, and bucking bar 50, are provided for the flow of current. In order to control the amount of current flowing through these paths, a quantity of inductive iron 58 is placed around one of them. When there is a sudden increase of current flow in either direction, part of it is retarded from flowing through 56—56, due to the inductive iron 58. The remainder, following the path of least resistance, will pass through the bucking bar 50. The amount of current retarded depends upon the steepness of the wave front of the current increase.

If the current flow is opposite to the normal direction of the current flow in the breaker, it will oppose the magnetic field in the magnet 100 set up by the independently energized shunt coil 103, and so reduce the attractive power of the magnet that the armature 101 will pull away, and the breaker will function as described in the specification.

On the other hand, if the flow of current is in the normal, or forward direction, it will be in the same direction as that of the shunt coil 103, and will add to the flux already established in the magnet 100. When it reaches a predetermined intensity, it will set up sufficient attractive force to draw the armature 350, Figure 3, against the bias of spring 351, up against the lower pole face of magnet 100. This action, as can be seen in Fig. 5, causes the plunger 356 to pry the armature 101 away from the upper pole face of magnet 100, thereby breaking the attraction of the magnet for the armature 101 and thus permitting the breaker to function as designed.

The conditions described are for predetermined rates of rise within calibrated limits. Excessive surges of current, due to short circuit, will cause a similar action to take place.

In a modified form of overcurrent and reverse current control, part of the inductive iron 58 is removed from conductor 56—56, as shown in Figures 16, 17 and 18, and replaced with a field structure 400 and an armature 401. In the case of a forward overload in the main circuit, of a predetermined intensity (in the neighborhood of 8000 to 12,000 amperes), the armature 401 will be attracted by the magnet 400, actuating a switch 402 that de-energizes the potential coil 103, which, in turn, causes the collapse of the field in the magnet 100 and allows the breaker to function as described above. In the case of an overload, having a steep rate of rise, the magnet 400, being on the same leg of the circuit as the rate of rise iron 58 (or inductive iron 58), most of the current will be by-passed through the bucking bar 50. Thus the magnet 400 would not give overload protection until the value of current in the main current carrying conductor was dangerously high. Therefore, an additional tripping device is required for short circuit current protection.

When sudden and excessively high surges of current, caused by a short circuit, or when the values of current go from 16,000 to 24,000 amperes or higher, the field structure 500 attracts the armature 501 which lifts the lever 502. This lever, being pivoted at 503 and contacting the manual trip lever 312 through stud 504, depresses the manual trip lever 312, which in turn pries the armature 101 off the upper pole face of magnet 100, and actuates the breaker. The action of the manual tripping device 317 has been previously described.

Since the magnet 500 is on the main current carrying conductor, it is only affected by the value of the current passing through it. When it is calibrated at 100% of overload it will be unaffected by peaks of current of short duration, as long as they are not in excess of 100% of overload. However, magnet 500 and armature 501 will function instantaneously on high values of current.

From this it is evident that the magnet 400 is required to give normal overload protection, while the magnet 500 is operative on short circuit currents or other excessively high current values which require rapid opening of the breaker.

The location and adjustment of these devices determines their selective operation. In the case of the magnet 400, it is placed on only one of the two current carrying paths, and is calibrated to function when a current of between 8,000 and 12,000 amperes flows through the main circuit. The other device, magnet 500, attached to a longer main terminal 60, being subjected to the passage of all the current going through the breaker, is calibrated to act on currents in the order of 16,000 to 24,000 amperes, and will be unaffected by the passage of smaller currents, thereby only functioning within its predetermined range.

In the foregoing I have described my invention in connection only with preferred embodiments. Since many modifications and variations of my invention should now be obvious to those skilled in the art, I prefer to be bound not by the specific disclosures herein but only by the appended claims.

I claim:

1. In a circuit breaker having a movable contact; a second contact in engagement with said movable contact; a connecting arm notched at one end and movable with said movable contact; a roller seated in said notch; a spring applying a force to said movable contact tending to effect disengagement of said contacts; said spring acting on said arm to bring it into line contact with said roller and exerting a portion of the spring force to produce a rotative force on said roller tending to roll it out of said notch; said roller in the notch acting as a stop for preventing disengagement of said contacts by said spring; a pivoted arm having a notch, said roller also being seated in the notch of said pivoted arm; a holding magnet having an armature secured to said pivoted arm for producing a force on said pivoted arm sufficient to overcome the rotative force of said spring on said roller to prevent said roller from rolling out of the notch of said connecting arm, said armature on being released by said magnet permitting said pivoted arm to move under the action of the rotation of said roller until said roller has moved out of said notches, said spring thereupon operating said contacts to disengaged position.

2. In a circuit breaker having a movable contact; a second contact in engagement with said movable contact; a connecting arm notched at one end and movable with said movable contact; a roller seated in said notch; a spring applying a force to said movable contact tending to effect disengagement of said contacts; said spring acting on said arm to bring it into line contact with said roller and exerting a portion of the spring force to produce a rotative force on said roller tending to roll it out of said notch; said roller in the notch acting as a stop for preventing disengagement of said contacts by said spring; a movable arm having a notch in complementary relation to said first mentioned notch for engaging said roller; a holding magnet having an armature secured to said movable arm for producing a force on said movable arm sufficient to overcome the rotative force of said spring on said roller to prevent said roller from rolling out of the notch of said connecting arm, said armature on being released by said magnet permitting said movable arm to move under the action of the rotation of said roller until said roller has moved out of said notch, said spring thereupon operating said contacts to disengaged position.

3. In a circuit breaker having a pair of cooperable contacts, a first member having a notch and controlling the engagement of said contacts, a spring biasing said member in one direction, a pivoted member having a notch in cooperative relation with said first mentioned notch; a roller in the seat formed by said cooperating notches, the roller having a line of tangential contact with the notch in said pivoted member along a line in said notch spaced from the horizontal axis of said roller so that said spring through said roller produces a rotative force on said pivoted member and an electromagnet which, when energized prevents said pivoted member from being rotated by said spring; said electromagnet when de-energized releasing said pivoted member which therefore is rotated about its pivot by the action of said spring through said roller.

4. In a circuit breaker having a pair of cooperable contacts, a first member for controlling the engagement of said contacts, a spring biasing said member in one direction, said member having a notch in one surface thereof, a pivoted member having a notch; said member being positioned so that its notch is opposite the notch of said spring biased member and forms a seating therewith; a roller in the seat formed by the two opposed notches, the roller having a line of tangential contact with the notch in said pivoted member along a line in said notch displaced from the central axis of said roller and furthest from its pivot, said spring biasing said member in a direction to bring the roller in a line of tangential contact with the notch in said spring biased member along a line in said notch furthest from said spring so that said spring through said roller produces a rotative force on said pivoted member and an electromagnet having an armature exerting a force on said pivoted member at right angles to said spring on said first member to prevent said pivoted member from being rotated by said spring; said electromagnet when de-energized releasing said second pivoted member which therefore is rotated about its pivot by the action of said spring through said roller.

5. In a circuit breaker having a pair of cooperable contacts, a first member for controlling the engagement of said contacts, a spring biasing said member in one direction, said member having a notch in one surface thereof, a pivoted member having a notch; said member being positioned so that its notch is opposite the notch of said spring biased member and forms a seating therewith; a roller in the seat formed by the two opposed notches, the roller having a line of tangential contact with the notch in said pivoted member along a line in said notch furthest from the pivot, said spring biasing said member in a direction to bring the roller in a line of tangential contact with the notch in said spring biased member along a line in said last mentioned notch furthest from said spring so that said spring through said roller produces a rotative force on said pivoted member and an electromagnet which, when energized prevents said pivoted member from being rotated by said spring; said electromagnet when de-energized releasing said pivoted member which thereupon is rotated about its pivot by the action of said spring through said roller.

6. In a circuit breaker having a pair of cooperable contacts, a first member for controlling the engagement of said contacts, a spring biasing said member in one direction, said member having a notch in one surface thereof, a pivoted member having a notch; said member being positioned so that its notch is opposite the notch of said spring biased member and forms a seating therewith; a roller in the seat formed by the two opposed notches, the roller having a line of tangential contact with the notch in said pivoted member along a line in said notch displaced from the horizontal axis of said roller and furthest from the pivot, said spring biasing said member in a direction to bring the roller in a line of tangential contact with the notch in said spring biased member along a line in said last mentioned notch furthest from said spring so that said spring through said roller produces a rotative force on said pivoted member and an electromagnet which, when energized prevents said second pivoted member from being rotated by said spring; said electromagnet when de-energized releasing said second pivoted member which thereupon is rotated about its pivot by the action of said spring through said roller.

DONALD I. BOHN.

REFERENCES CITED

The following references are of record in the file of this patent:

UNITED STATES PATENTS

| Number | Name | Date |
|---|---|---|
| 594,879 | Ihlder | Dec. 7, 1897 |
| 755,731 | Alexander | Mar. 29, 1904 |
| 772,914 | Badeau | Oct. 25, 1904 |
| 958,804 | Hallock | May 24, 1910 |
| 963,728 | Ayer | July 5, 1910 |
| 998,580 | Horton | July 18, 1911 |
| 1,099,332 | Aalborg | June 9, 1914 |
| 1,120,222 | Murray et al. | Dec. 8, 1914 |
| 1,315,809 | Basch | Sept. 9, 1919 |
| 1,420,935 | Lucas et al. | June 27, 1922 |
| 1,729,538 | Coates et al. | Sept. 24, 1929 |
| 1,775,810 | Clark | Sept. 16, 1930 |
| 1,813,181 | MacNeil | July 7, 1931 |
| 1,813,191 | Mottlau | July 7, 1931 |
| 1,816,789 | Pailin | July 28, 1931 |
| 1,926,989 | Garnert | Sept. 12, 1933 |
| 2,091,815 | Hommel | Aug. 31, 1937 |
| 2,150,566 | Scott, Jr. | Mar. 14, 1939 |
| 2,224,380 | Crabbs et al. | Dec. 10, 1940 |
| 2,225,252 | Auld et al. | Dec. 17, 1940 |

FOREIGN PATENTS

| Number | Country | Date |
|---|---|---|
| 445,215 | Germany | June 2, 1927 |